United States Patent [19]

Yagishita

[11] Patent Number: 5,923,828
[45] Date of Patent: Jul. 13, 1999

[54] IMAGE FORMING APPARATUS WHICH FORMS AN IMAGE BASED ON BIT MAP DATA

[75] Inventor: Takahiro Yagishita, Yokohama, Japan

[73] Assignee: Ricoh Company, Ltd., Tokyo, Japan

[21] Appl. No.: 08/806,091

[22] Filed: Feb. 25, 1997

[30] Foreign Application Priority Data

Mar. 25, 1996 [JP] Japan ..................................... 8-096071

[51] Int. Cl.$^6$ ...................................................... B41B 15/00
[52] U.S. Cl. ............................ 395/116; 395/114; 395/115
[58] Field of Search ..................................... 395/115, 116,
395/101, 114, 888, 877, 835, 837, 872;
345/202

[56] References Cited

U.S. PATENT DOCUMENTS 5,771,340  6/1998  Nakazato et al. ........................ 395/114

Primary Examiner—Arthur G. Evans
Assistant Examiner—Sterling W. Chandler
Attorney, Agent, or Firm—Oblon, Spivak, McClelland, Maier & Neustadt, P.C

[57] ABSTRACT

An image forming apparatus which forms an image based on bit map data. A compressing circuit compresses the bit map data to generate compressed data by reversible compression, and the compressed data is then stored in a first storing unit, such as a frame memory. Then, a decompression circuit reads and decompresses the compressed data. The decompressed data can then be stored in a second memory unit, such as a FIFO memory. An amount of data stored in the second memory is detected and based on the amount of data detected, a controller controls reading of the compressed data by the decompression unit. Based on the detected amount of data stored in the second storing unit, the decompression unit can execute a non-reversible decompression operation in which data is omitted prior to being stored in the second storing unit. An image based on the decompression data from the second storing unit is then recorded. The omitted data can also be reintroduced onto a finally recorded image, so that the recorded image fully corresponds to the original image data.

24 Claims, 4 Drawing Sheets

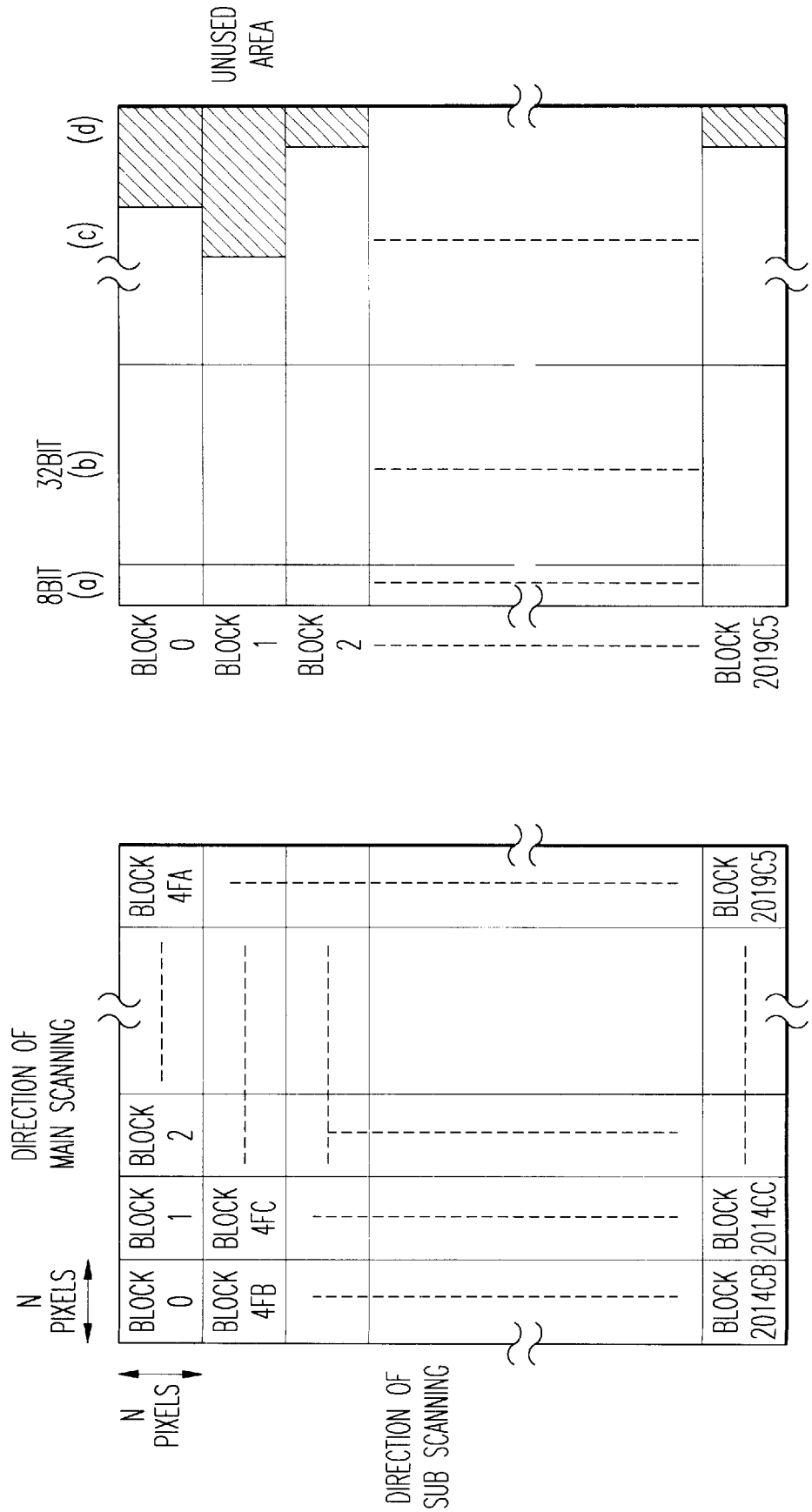

IMAGE FORMING APPARATUS WHICH FORMS AN IMAGE BASED ON BIT MAP DATA

BACKGROUND OF THE INVENTION

1. Field of the Invention

This invention relates to an image forming apparatus such as a printer, a copier, a facsimile, and so on, which forms an image on a record medium based on bit map data.

2. Discussion of the Background

An image forming apparatus, for example a printer, records an image at high speed page by page. Therefore, in a printer, at first, bit map data of one or more pages is stored in a frame memory. Thereafter, the bit map data which is stored in the frame memory is read continuously and a printer records an image based on this bit map data.

However, because a quantity of the bit map data is large, a large frame memory is needed, and as a result the cost of the printer increases. To prevent this cost increase, a printer which has a frame memory of a smaller capacity is known. In this printer, bit map data is compressed and is stored in the smaller capacity frame memory, and when the stored bit map data is read out of this frame memory, the bit map data is decompressed.

However, this printer which stores bit map data in the frame memory with a compression operation has the following problems.

First, when the compression is an non-reversible compression, which obtains a high compression ratio, an image which is formed on a record medium is degraded because the bit map data of the original image is not exactly reproduced. This image degradation is not conspicuous in an image area but is conspicuous in a text area.

A second problem is concerned with a speed followability. An overrun is a phenomenon in which a speed of a printing operation exceeds that of a decompression operation, resulting in print data not being supplied to the printer when the printer is ready to print data.

To solve the first problem, an operation of separating a text area and an image area in a recording apparatus which executes a compression operation at a compression ratio which is suited for each area is proposed by Japanese Patent Laid-Open No. HEI 4-282271. In this apparatus, first it is determined whether data stored in a page buffer is image data or text data. Then, based on a distinction of this determination, when the data is determined to be text data, the data is compressed at a compression ratio which is suited to text data by a text data compression circuit. And, when the data is determined to be image data, the data is compressed at a compression ratio which is suited to image data by an image data compression circuit. Then, the compressed text data is stored in a frame memory for text data, and also the compressed image data is stored in a frame memory for image data. The stored text data and the stored image data are then decompressed by a decompression circuit which corresponds to each type of data when read out. The decompressed data is then recorded onto a record medium.

On the other hand, to solve the second problem, an image forming apparatus which makes an operation speed of a printer low-speed based on the decompressed image data is proposed by Japanese Patent Laid-Open No. HEI 6-183070. In this apparatus, first it is determined whether given data is bit image data, character code data or compression image data. Based on this determination, when the given data is determined to be compression image data, a print speed of a printer is changed to a low speed as required by the time necessary for a decompression operation to be executed. This apparatus tries to prevent an overrun condition by making a decompression speed and print speed agree by changing the print speed.

However, in the background art described Japanese Patent Laid-Open No. HEI 4-282271, depending on the page-description language which is input to the apparatus, the determination between the text data and an image data is sometimes difficult. In this case, there is a drawback that degradation of the image formed on the record medium may occur.

Also, in the background art described Japanese Patent Laid-Open No. HEI 6-183070, the cost of the apparatus rises because a unit for changing a print speed is necessary. Moreover, a speed of a printer has a lower limit from a characteristic of an apparatus. For these reasons, there is a drawback that an overrun condition may still occur in the case that a decompression speed is very low.

SUMMARY OF THE INVENTION

Accordingly, one object of this invention is to provide a novel image forming apparatus which prevents degradation of an image and which does not require a large memory.

To achieve such an objective in the present invention, the present invention includes an image recording apparatus which forms an image based on bit map data. The bit map data is compressed by reversible compression to generate compressed data and this compressed data can be stored in a first memory, such as a frame memory. This compressed data stored in the frame memory can then be read and decompressed to generate decompressed data. The decompressed data can then be stored in a second memory, such as a FIFO memory.

Moreover, according to the present invention an amount of data stored in the second memory can be detected. Based on the amount of data detected as being stored in the FIFO memory, a controller controls reading of the compressed data by the decompression unit. Based on the detected amount of the data stored in the second memory, the decompression unit can operate in a non-reversible decompression operation in which data is omitted prior to being stored in the second memory. An image based on the decompressed data from the second memory is then recorded.

With the operation of the system of the present invention, an overflow condition in which an excessive amount of data is provided to FIFO memory can be avoided. Moreover, the system of the present invention can also avoid an overrun condition in which the FIFO memory becomes empty during recording of the image data.

As a further feature of the present invention, if data is omitted as it is input into FIFO memory, an overforming operation can be performed such that such omitted data is superimposed on the image data based on the decompressed data with the omitted data, so that thereby complete image data can be recorded.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 2 shows a compression operation in a compression circuit of the embodiment of the present invention;

FIG. 3 is a memory map of a frame memory of the embodiment of the present invention;

DESCRIPTION OF THE PREFERRED EMBODIMENTS

Figure 1:
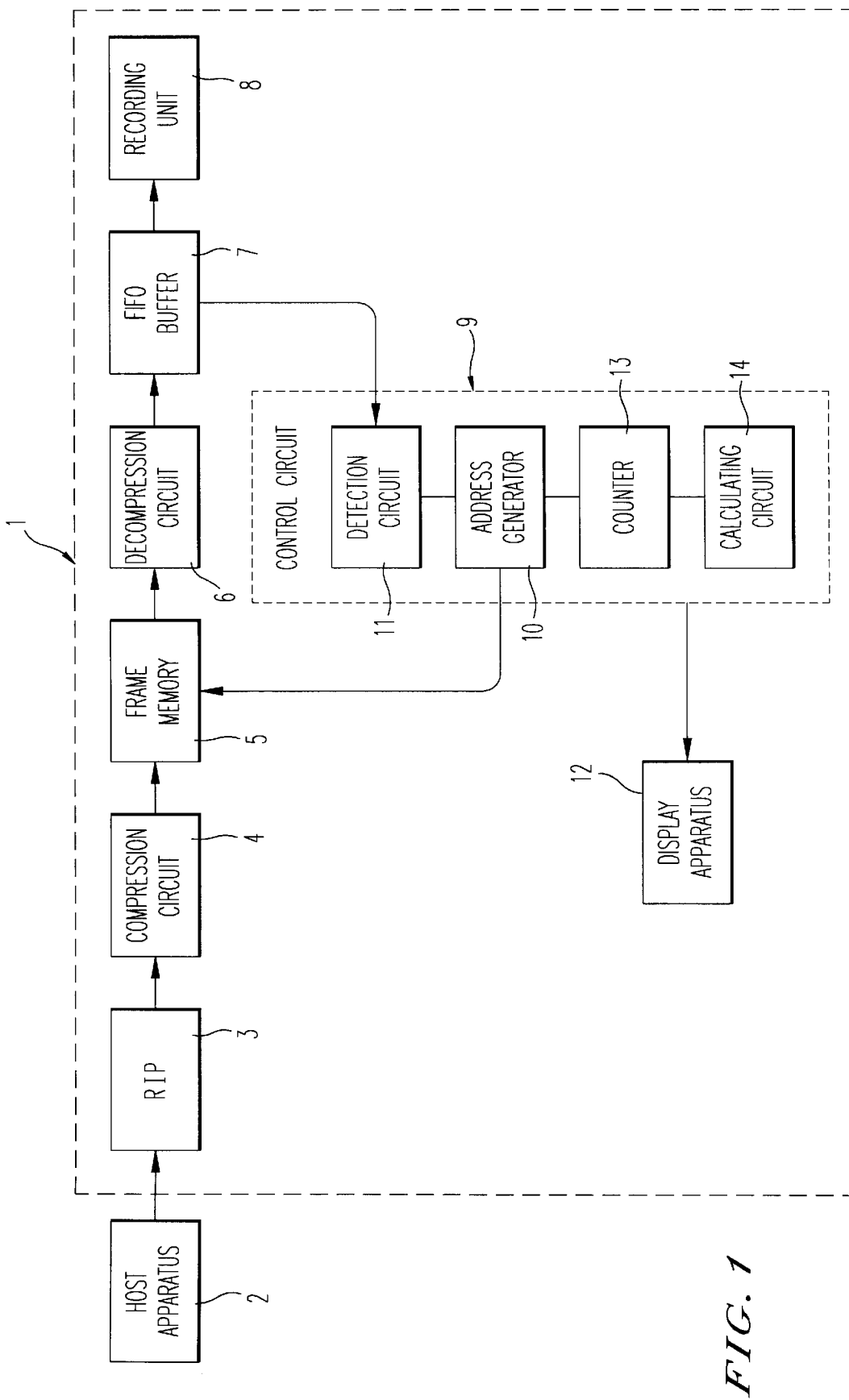
FIG. 1 is a block diagram showing a laser-beam printer (LBP) according to an embodiment of the present invention.

Referring now to the drawings, wherein like reference numerals designate identical or corresponding parts throughout the several views, the operation of the present invention will now be described.

After examining ways to solve the drawbacks in the background art, the Applicant of the present invention recognized the following two facts. (1) In reversible compression of bit map data for an image area a compression ratio tends to be low, and for a text area a compression ratio tends to be high. (2) In decompressing a reversibly compressed bit map data to original bit map data, when a compression ratio is low, a decompression speed is low, and when the compression ratio is high, a decompression speed is high.

The present invention as now disclosed utilizes these facts.

FIG. 1 is a block diagram showing a laser-beam printer (LBP) according to an embodiment of the present invention.

As shown in FIG. 1, a printer 1 forms an image on a record media, such as a record paper, based on image formation sent from a host apparatus 2. The image information sent from the host apparatus 2 may be in a page-description language. As this page-description language, the PostScript (trademark of the Adobe company) is typical.

The page-description language data which is sent from the host apparatus 2 is input to a raster image processor part (RIP) 3 of the printer 1 through a host interface (not illustrated). In this RIP 3, the input page-description language data is changed into bit map data. This bit map data is then input to a compression circuit 4. In this compression circuit 4, the input bit map data is compressed by reversible compression and compressed data is generated. The compressed data is then stored in the frame memory 5.

In a decompression circuit 6, the compressed data which is stored in frame memory 5 is read and decompressed. The decompressed data is then sent to a recording unit 8 through a FIFO (First-In-First-Out) buffer 7. The recording unit 8 then forms an image on a record medium by an electrophotography method based on the input decompressed data.

FIG. 2 shows the compression operation in the compression circuit 4. The compression circuit 4 compresses data in sub-block units which are formed from N×N pixels. In this embodiment, the sub-block is formed from 4×4 pixels, that is, the sub-block is construed from 16 pixels bit map data. Data of one pixel is 8 bits, which is necessary to express 256 levels of gray (hereafter this 8 bit data of one pixel is referred to as gray-scale data).

As for one sub-block, an average of the gray-scale data of the 16 pixels is computed and is expressed by 8 bit data. As for each pixel of the 16 pixels, a difference between gray-scale data and the average is computed. A computed difference is expressed by a combination of a fixed length data (2 bits/1 pixel) and a Hoffmann mark with variable length.

This compression of the sub-blocks is executed on the entire bit map data for one page. This compression is reversible compression, and therefore, if a decompression is executed using all of the compressed data, the original bit map data is exactly reproduced. The bit map data which is compressed into compressed data by compression circuit 4 in this way is then stored in the frame memory 5.

FIG. 3 is a memory map of frame memory 5. Section (a) denotes a part which stores the above-noted average gray-scale data in 8 bits, the section (b) denotes a part which stores the above computed difference data of 2 bits per 1 pixel for the fixed length data of the 16 pixels, and section (c) denotes a part which stores the above Hoffman mark with variable length. Moreover, section (d) is left as an unused area.

Returning to FIG. 1, when the compressed data for all of one page for a sub-block is stored in frame memory 5, the recording unit 8 starts. The compressed data in frame memory 5 is read every one sub-block and is decompressed by decompression circuit 6. The decompressed data is sent to recording unit 8 through FIFO buffer 7. FIFO buffer 7 adjusts for a difference between a forwarding speed of the decompressed data to recording unit 8 and a decompression speed of decompression circuit 6.

When sending decompressed data to recording unit 8 through FIFO buffer 7, when a decompression processing speed at the decompression circuit 6 is slower than a forwarding speed with which data is forwarded from FIFO buffer 7 to recording unit 8, the decompressed data in FIFO buffer 7 decreases. When FIFO buffer 7 becomes empty, there is no longer any decompressed data to forward to recording unit 8, and recording unit 8 is thereby no longer able to execute a normal image forming operation. This phenomenon is called "an overrun". The operation of the present invention as discussed below prevents such an "overrun" situation.

On the other hand, when a speed of the decompression processing at the decompression circuit 6 is faster than a transfer rate of transferring data to recording unit 8, the FIFO buffer 7 becomes full and the decompressed data may overflow. In this case, a normal image forming also cannot be executed. The operation of the present as discussed below also prevents such a situation.

To solve these problems, in an embodiment of the present invention, a reading of the compressed data stored in the frame memory 5 and the decompression processing which depends on decompression circuit 6 are executed by a feedback control, now more fully discussed below.

Figure 4:
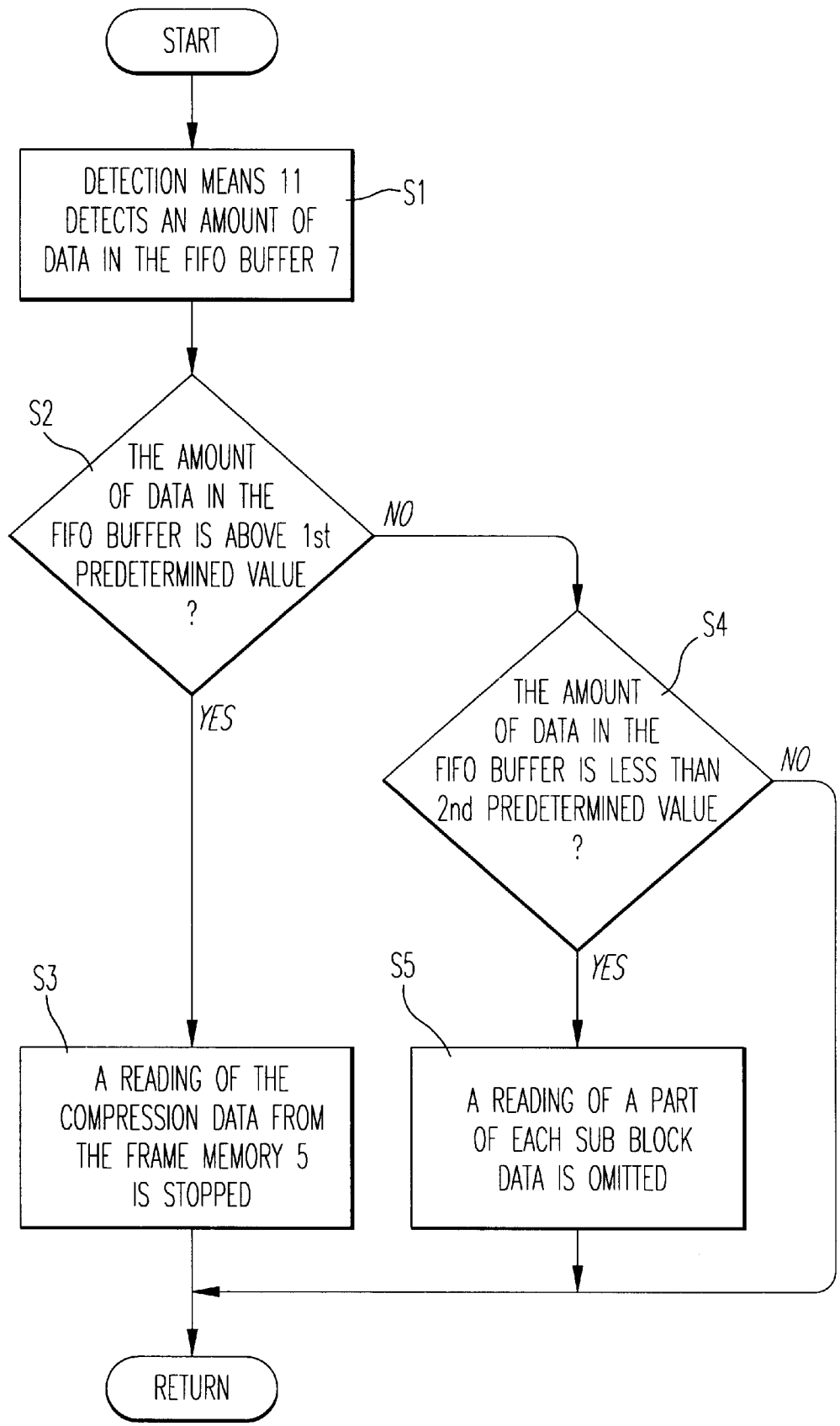
FIG. 4 is a flowchart of a feedback control of the embodiment of the present invention.

FIG. 4 is a flowchart of a feedback control of the present invention. First, at step S1 a detection circuit 11 (see FIG. 1) of a controller 9 detects an amount of data in the FIFO buffer 7. At step S2, when the detected amount of data in the FIFO buffer 7 is greater than a first predetermined value, YES in step S2, a reading of the compressed data from the frame memory 5 is stopped in step S3. This prevents the situation in which the FIFO buffer 7 overflows as this first predetermined value is approximately the limit value of the amount of data which could be processed without an overflow and without a data omitting operation as discussed below.

When the amount of data in the FIFO buffer 7 is less than the first predetermined value, NO in step S2, the program proceeds to step S4. At step S4, the amount of data in FIFO memory 7 is again detected, and the detected amount of data is compared with a second predetermined value. When this detection result is less than the second predetermined value, YES in step S4, a reading of a part of each sub-block data is omitted in step S5. That is, if YES in step S4 a non-reversible decompression is executed in step S5. The second predetermined value is a limit value of an amount of data which can be processed without an overrun.

In this operation, if the detected amount of the data in FIFO buffer 7 is less than the second predetermined value in step S4, this indicates that there is a very small amount of data in the FIFO buffer 7. This may give rise to an overrun situation in which FIFO buffer 7 becomes empty while recording unit 8 is printing data. To prevent this occurrence of an overrun, in the operation of the present invention when the detected amount of data in the FIFO buffer 7 becomes less than the second predetermined value, i.e., YES in step S4, in reading subsequent image data from the frame memory 5 a portion of the read image data is omitted. As a result of this operation of the present invention, the operation speed in the decompression circuit 6 is increased, and thereby the rate at which data is input into FIFO buffer 7 from decompression circuit 6 is increased. This increase in the rate in which data is input from decompression circuit 6 into FIFO buffer 7 prevents FIFO buffer 7 from becoming empty while recording unit 8 is still printing data, i.e., prevents an overrun situation.

As an example of the data omission, in the memory map of FIG. 3, the data in sections (a) and (b) is read, and the data in section (c) is not read, i.e., the data in section 3(c) is omitted. In this situation, data decompression in decompression circuit 6 is executed based on only the data in sections (a) and (b), and therefore, a decompression speed is higher than if based on all the data so that the rate at which data is fed to FIFO buffer 7 is increased. Therefore, it is possible to prevent the FIFO buffer 7 from becoming empty, i.e, the overrun situation can be prevented.

This decompression of the data with the data omission is a non-reversible decompression, and therefore, the formal image is different from the original image. However, this does not result in a significant fault in the results of the operation of the present invention for the following reasons.

When compressed data in a text area is decompressed by non-reversible decompression, the image degradation is conspicuous, but when compressed data in an image area is decompressed by non-reversible decompression, the image degradation is not conspicuous. In the feedback control of the present invention as discussed above and as shown in FIG. 4, the non-reversible decompression will be executed typically only at an image area.

This point is now explained in more detail. When executing a reversible compression in an image area and a text area, a compression ratio of the image area is lower than a compression ratio of the text area. As mentioned above, the lower the compression ratio, the slower a speed of a decompression processing. Therefore, in an image area with a low compression ratio, a processing time for the decompression required by decompression circuit 6 is long. Consequently, when a sub-block in an image area with the long processing time is decompressed, the amount of data in FIFO buffer 7 may become less than the second predetermined value, and thereby the non-reversible decompression with the data omission may be executed. On the other hand, when a sub-block in a text area is being decompressed, the compression ratio is high, and therefore a short processing time by decompression circuit 6 is required. As a result, when a sub-block in a text area is decompressed, the amount of data in FIFO buffer 7 will typically be greater than the second predetermined value, so that the data omission operation is not executed. Thus, there will be no degradation of a text area.

As a result, according to the above-mentioned feedback control, sub-blocks in an image area may be decompressed by a non-reversible decompression with the data omitting, and most sub-blocks in a text area are decompressed by a reversible decompression.

According to the feedback control of this embodiment, even though a circuit is not provided for directly distinguishing between a text area and an image area, as for the text area, reversible decompression is executed, and as for the image area, non-reversible decompression may be executed. As a result, image degradation is minimized.

It is also noted that in an image data area, data may also be decompressed reversibly, and an image formed by an original bit map is good for a prevention of image degradation. In the above feedback control, a choice of the reversible decompression or the non-reversible decompression may be dynamically changed. Therefore, when the compression ratio is high and the decompression processing speed is high, even if decompressed data is in an image area, the compressed data may be decompressed by reversible decompression.

In this embodiment, reading of the compressed data from the frame memory 5 is executed based on an address generated by address generator 10 in controller 9, see FIG. 1. That is, based on an output from the detection circuit 11, the address generator 10 changes a generating address, and compressed data is read based on this address.

Moreover, the controller 9 has a counter 13 as a measurement unit. This counter 13 counts a quantity of the compressed data for which reading was omitted. That is, counter 13 counts the omitted data or how many times step S5 of FIG. 4 is executed. The count result which is counted by the counter 13 is sent to a display apparatus 12 after processing in controller 9. Then, the display apparatus 12 displays an existence or non-existence of the compressed data which was omitted and/or a ratio of the compressed data which was omitted to all the compressed data in frame memory 5. The display information indicates to an operator how much data is being stored with the data omission operation.

Moreover, the counter 13 counts a number of the sub-blocks decompressed by non-reversible decompression and the display apparatus 12 displays the existence or non-existence of the compressed data decompressed by non-reversible decompression data and/or the ratio of the compressed data decompressed by non-reversible decompression to all the compressed data stored in frame memory 5.

As mentioned above, the non-reversible decompression is executed when a decrease of the amount of data in the FIFO buffer 7 occurs. This decrease occurs because the decompression processing speed which depends on decompression circuit 6 is less than a speed of sending data from FIFO memory 7 to the recording unit 8.

Therefore, if the capacity of the FIFO buffer memory 7 is large enough, and if decompressed data is allowed to accumulate in FIFO buffer 7 before beginning the operation of forwarding data from the FIFO buffer 7 to the recording unit 8 (although the amount of data allowed to accumulate in FIFO buffer 7 must still be less than the first predetermined value), then even if the decompression speed is low, non-reversible decompression is not executed. This results because data is allowed to accumulate in FIFO buffer 7 before beginning the outputting of data from the FIFO buffer 7. As a result, the amount of data in FIFO buffer 7 will not fall below the second predetermined value.

As a further feature of this embodiment, a required amount of the FIFO buffer memory 7 to avoid executing the non-reversible decompression can be displayed based on a first executed image forming process. Calculating circuit 14 in controller 9 calculates the required capacity of FIFO buffer 7 to prevent executing non-reversible decompression based on the quantity of the compressed data which was omitted by the non-reversible decompression in the first executed image forming process. Then, for subsequent of the image forming processing the calculation result is displayed at the display apparatus 12. By seeing this display, an operator can know the quantity of the memory which is necessary to not execute the non-reversible decompression. If the FIFO memory 7 is expandable, the operator can expand FIFO memory 7 to avoid the non-reversible decompression with data omission.

The above non-reversible decompression operation of this embodiment is a decompression operation which omits reading of a part of the compressed data. In the one example noted above, data section (c) of FIG. 3 is omitted. That is, the non-reversible decompression omits a part of the bit map data developed in the RIP 3 corresponding to this data section (c).

In one operation in the present invention, this omitted data may be data which is permanently omitted. However, the present invention may implement a further operation in which this omitted data can be restored onto a printed document. With this further operation of the present invention, there will be no degradation of the recorded image data as the omitted data is reintroduced into the recorded image.

To achieve this operation, the printer 1 of this embodiment may have a function to form an image based on the omitted data, and this image forming operation is executed on the recording paper on which image data based on non-reversible decompression is initially formed. This image of the omitted data is formed over or superimposed on the initial image data formed based on the non-reversible decompressed data (this operation is hereafter referred to as an overforming function).

Figure 5:
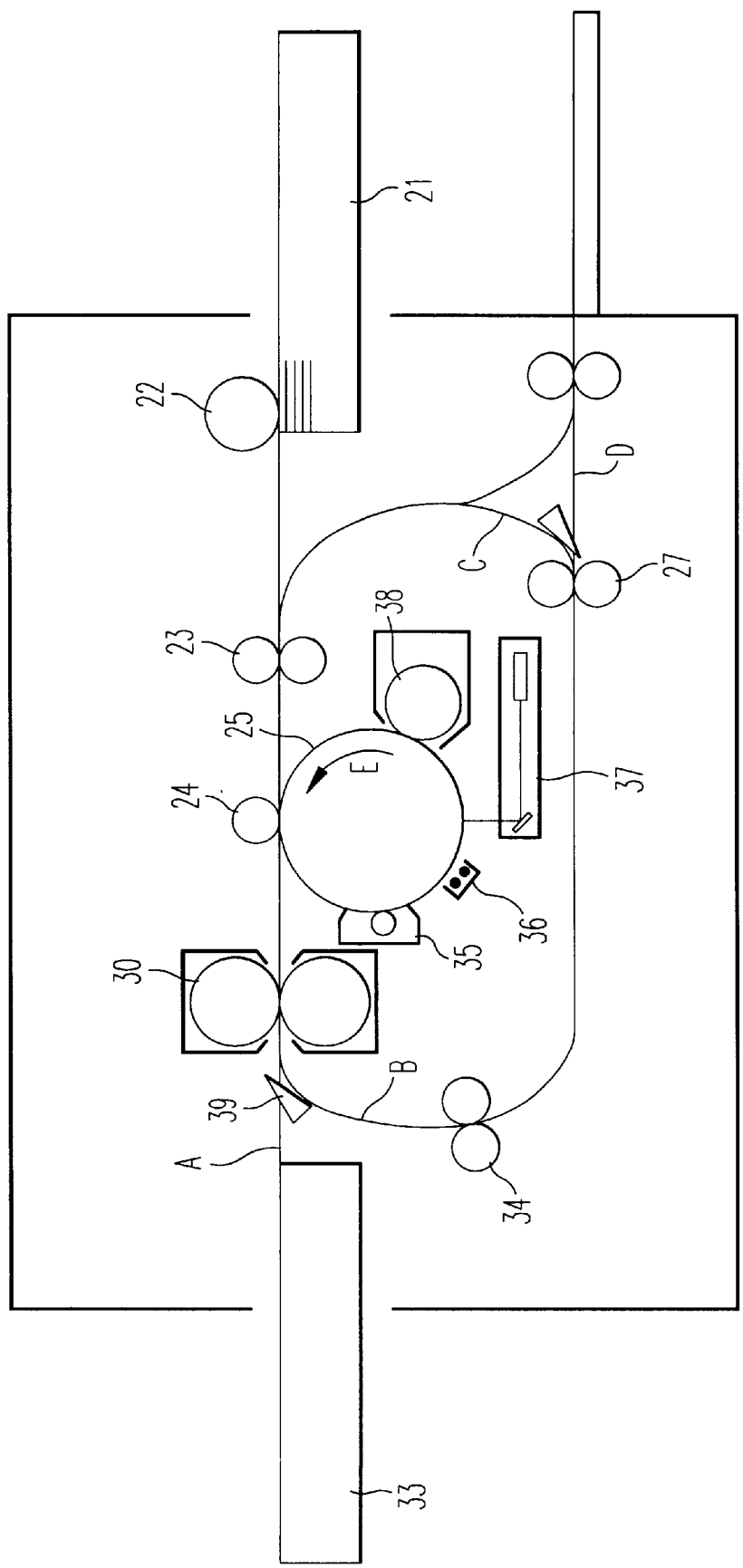
FIG. 5 is a sectional view showing a structure of a recording unit of the embodiment of the present invention.

The overforming function based on the bit map data with the data omission as noted above will now be further explained. FIG. 5 is a sectional view showing a structure of the recording unit 8.

Numeral 25 is an electrostatic drum which turns in a direction of arrow E. A surface of this electrostatic drum 25 is charged by a charging apparatus 36. A light writing unit 37 forms a static image on the surface of the electrostatic drum 25 based on the non-reversible decompressed data sent from FIFO buffer 7. This static image is developed to a toner image by a development apparatus 38.

On the other hand, a recording paper as the recording medium is provided from a paper tray 21 by a providing roller 22. The recording paper halts in resist roller 23, and then the record paper with the toner image on the electrostatic drum 25 is conveyed to the contact part of electrostatic drum 25 in timing with rotation of electrostatic drum 25. The toner image of the surface of the electrostatic drum 25 is transferred to the record paper by transferring roller 24.

The record paper on which formation of the toner image is completed is then conveyed to fixation apparatus 30 and this fixation apparatus 30 fixes the toner image on the record paper. Then, generally, the record paper is led to conveyance route A by a changing nail 39 and the record paper is discharged to output tray 33.

However, in the overforming function, after the image data of the non-reversible decompression, i.e., with the data omission, is fixed on the record paper, the record paper is led to conveyance route B by the changing nail 39.

The record paper led to conveyance route B is then led to conveyance route C by a first conveyance roller 34 and a second conveyance roller 27 and is again conveyed to resist roller 23. During this operation, the light writing part 37 forms a static image based only on the omitted bit map data on the surface of the electrostatic drum 25 which is charged by the charging unit 36 again.

This static image corresponding to only the omitted bit map data is developed as a toner image with development apparatus 38 in the same way as the first image data of the non-reversible decompression, and then this toner image of the omitted bit map data is transferred to the record paper which was rescinded via conveyance route C by transferring roller 24 in correspondence with the image data of the non-reversible decompression already formed on the record paper. Then, the fixation apparatus 30 refixes the toner images.

According to the above operation, the image based on the decompressed data which is decompressed by non-reversible decompression and the image based on the bit map data which is omitted in the non-reversible decompression are formed over one another on identical surfaces of the identical record paper.

As a result of this operation, an image based on the bit map data which was developed by RIP part 3 is able to be reproduced completely.

A conveyance route D is also provided and is switched to for a double-sided printing.

This invention as described above may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuit or by interconnecting an appropriate network of conventional components, as will be readily apparent to those skilled in the art.

This application is based on Japanese patent application HEI 8-96071 filed in the Japanese Patent Office on Mar. 25, 1996, the entire contents of which are hereby incorporated by reference.

Obviously, additional modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. An image recording apparatus which forms an image based on bit map data, comprising:

compressing means for compressing the bit map data by reversible compression to generate compressed data;

first storing means for storing the compressed data;

decompressing means for reading said compressed data from the first storing means and decompressing the read compressed data to generate decompressed data;

second storing means for storing the decompressed data;

detecting means for detecting an amount of data stored in the second storing means;

control means for controlling said reading of the compressed data by the decompressing means based on the amount of data detected by the detecting means; and recording means for recording a first image based on said decompressed data from said second storing means.

2. An image recording apparatus according to claim 1, wherein the second storing means is a FIFO memory.

3. An image recording apparatus according to claim 1, wherein the first storing means is a frame memory.

4. An image recording apparatus according to claim 1, wherein when the amount of data stored in the second storing means detected by the detecting means is less than a predetermined value, a part of said compressed data read by the decompressing means is omitted.

5. An image recording apparatus according to claim 4, further comprising:
  measurement means for measuring a quantity of said omitted compressed data read by said decompressing means; and
  display means for displaying at least one of an existence or non-existence of said omitted compressed data and a ratio of said omitted compressed data to all of said decompressed data in the second storing means based on said quantity of said omitted compressed data measured by said measurement means.

6. An image recording apparatus according to claim 4, further comprising:
  measurement means for measuring a quantity of said omitted compressed data read by said decompressing means;
  calculating means for calculating a capacity of a required amount of said second storing means for reading said compressed data without omitting any part of said compressed data; and
  display means for displaying said capacity of the required amount of said second storing means calculated by said calculating means.

7. An image recording apparatus according to claim 5, further comprising:
  calculating means for calculating a capacity of a required amount of said second storing means for reading said compressed data without omitting any part of said compressed data; and
  wherein the display means further displays said capacity of the required amount of said second memory means calculated by said calculating means.

8. An image recording apparatus according to claim 4, wherein said recording means records a second image based on the omitted part of the compressed data over the first recorded image.

9. An image recording apparatus according to claim 5, wherein said recording means records a second image based on the omitted part of the compressed data over the first recorded image.

10. An image recording apparatus according to claim 6, wherein said recording means records a second image based on the omitted part of the compressed data over the first recorded image.

11. An image recording apparatus according to claim 7, wherein said recording means records a second image based on the omitted part of the compressed data over the first recorded image.

12. An image recording apparatus which forms an image based on bit map data, comprising:
  a compressing circuit compressing the bit map data by reversible compression to generate compressed data;
  a first memory for storing the compressed data;
  a decompressing circuit reading said compressed data from the first memory and decompressing the read compressed data to generate decompressed data;
  a second memory storing the decompressed data;
  a detector detecting an amount of data stored in the second memory;
  a controller controlling said reading of the compressed data by the decompressing circuit based on the amount of data detected by the detector; and
  a recording circuit recording a first image based on said decompressed data from said second memory.

13. An image recording apparatus according to claim 12, wherein the second memory is a FIFO memory.

14. An image recording apparatus according to claim 12, wherein the first memory is a frame memory.

15. An image recording apparatus according to claim 12, wherein when the amount of data stored in the second memory detected by the detector is less than a predetermined value, a part of said compressed data read by the decompressing circuit is omitted.

16. An image recording apparatus according to claim 15, further comprising:
  a measurement circuit measuring a quantity of said omitted compressed data read by said decompressing circuit; and
  a display displaying at least one of an existence or non-existence of said omitted compressed data and a ratio of said omitted compressed data to all of said decompressed data in the second memory based on said quantity of said omitted compressed data measured by said measurement circuit.

17. An image recording apparatus according to claim 15, further comprising:
  a measurement circuit measuring a quantity of said omitted compressed data read by said decompressing circuit;
  a calculating circuit calculating a capacity of a required amount of said second memory for reading said compressed data without omitting any of said compressed data; and
  a display displaying said capacity of the required amount of said second memory calculated by said calculating circuit.

18. An image recording apparatus according to claim 16, further comprising:
  a calculating circuit calculating a capacity of a required amount of said second memory for reading said compressed data without omitting any of said compressed data; and
  wherein the display displays said capacity of the required amount of said second memory calculated by said calculating circuit.

19. An image recording apparatus according to claim 15, wherein said recording circuit records a second image based on the omitted part of the compressed data over the first recorded image.

20. An image recording apparatus according to claim 16, wherein said recording circuit records a second image based on the omitted part of the compressed data over the first recorded image.

21. An image recording apparatus according to claim 17, wherein said recording circuit records a second image based on the omitted part of the compressed data over the first recorded image.

22. An image recording apparatus according to claim 18, wherein said recording circuit records a second image based on the omitted part of the compressed data over the first recorded image.

23. An image forming apparatus which forms an image based on bit map data, comprising:

compressing means for compressing the bit map data to generate compressed data by reversible compression;

storing means for storing the compressed data;

decompressing means for reading the compressed data from the storing means and decompressing the read compressed data to generate decompressed data;

control means for controlling said reading of said compressed data by the decompressing means based on a compression ratio of said compressing by said compressing means; and recording means for recording an image based on said decompressed data;

wherein said control means controls whether a part of said reading of said compressed data by the decompressing means is omitted.

24. An image forming apparatus which forms an image based on bit map data, comprising:

compressing means for compressing the bit map data to generate compressed data by reversible compression;

storing means for storing said compressed data;

decompressing means for reading said compressed data from the storing means and decompressing the read compressed data to generate decompressed data;

control means for controlling said reading of said compressed data by the decompressing means based on a decompressing speed of said decompressing means; and recording means for recording an image based on said decompressed data;

wherein said control means controls whether a part of said reading of said compressed data by the decompressing means is omitted.

* * * * *